United States Patent
Imadu et al.

(10) Patent No.: US 7,501,783 B2
(45) Date of Patent: Mar. 10, 2009

(54) METHOD OF AUTOMATICALLY SETTING VIBRATION SUPPRESSION FILTER AND AUTOMATIC SETTING APPARATUS FOR VIBRATION SUPPRESSION FILTER

(75) Inventors: Atsushi Imadu, Fukuoka (JP); Yasuyuki Takei, Fukuoka (JP); Kazuhide Takao, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 87 days.

(21) Appl. No.: 11/629,859

(22) PCT Filed: Jun. 10, 2005

(86) PCT No.: PCT/JP2005/010688

§ 371 (c)(1),
(2), (4) Date: Dec. 18, 2006

(87) PCT Pub. No.: WO2005/124475

PCT Pub. Date: Dec. 29, 2005

(65) Prior Publication Data

US 2007/0205740 A1    Sep. 6, 2007

(30) Foreign Application Priority Data

Jun. 16, 2004   (JP) ............................... 2004-178261

(51) Int. Cl.
*G05B 5/01* (2006.01)

(52) U.S. Cl. .................. 318/611; 318/128; 700/275; 700/280

(58) Field of Classification Search ........... 318/128, 318/611; 700/280, 275
See application file for complete search history.

(56) References Cited

U.S. PATENT DOCUMENTS

| 6,144,181 | A  | * | 11/2000 | Rehm et al. ................ 318/629 |
| 6,240,246 | B1 | * | 5/2001  | Evans ......................... 388/814 |
| 6,469,467 | B1 | * | 10/2002 | Fujita ........................ 62/228.4 |
| 6,789,641 | B2 | * | 9/2004  | McLaughlin ............... 180/446 |
| 6,828,749 | B2 | * | 12/2004 | Zhang et al. ............... 318/611 |
| 6,936,990 | B2 | * | 8/2005  | Oyama et al. .............. 318/632 |
| 2003/0184251 | A1 | * | 10/2003 | Oyama et al. .............. 318/607 |

FOREIGN PATENT DOCUMENTS

| JP | 5-346813 A | 12/1993 |
| JP | 6-28006 A | 2/1994 |
| JP | 2003-52188 A | 2/2003 |
| JP | 2004-5469 A | 1/2004 |

* cited by examiner

*Primary Examiner*—Bentsu Ro
*Assistant Examiner*—David S Luo
(74) *Attorney, Agent, or Firm*—Sughrue Mion, PLLC

(57) ABSTRACT

In a method of automatically setting the vibration suppression filter, when a vibration detection portion detects a vibration A2, a state variable frequency analysis portion analyzes the frequencies of data from a state variable trace portion to calculate a vibration frequency A3, and the frequency characteristics of the vibration suppression filter is set based on vibration frequency A5. A vibration level store portion stores the vibration level before the automatic setting of the vibration suppression filter, a filter setting selection portion compares the vibration level after the automatic setting with the vibration level before the automatic setting A6. When the vibration level after the automatic setting is larger than the vibration level before the automatic setting, restoring of the setting of the vibration suppression filter to the state before the automatic setting A7 and/or reducing the gain of a servo control portion.

6 Claims, 7 Drawing Sheets

METHOD OF AUTOMATICALLY SETTING VIBRATION SUPPRESSION FILTER AND AUTOMATIC SETTING APPARATUS FOR VIBRATION SUPPRESSION FILTER

TECHNICAL FIELD

The present invention relates to a method of, in a servo control apparatus for driving a servomotor, detecting vibration when a machine etc. resonates to automatically set a vibration suppression filter.

BACKGROUND ART

For example, in an NC control apparatus of a working machine as shown in a patent document 1, a resonance frequency can be removed in a manner that, as shown in FIG. 7, a signal from a sweep signal generator (1 Hz to almost 100 Hz) 19 coupled to an adder is outputted as a positional command, then a frequency analyzer 20 detects the resonance frequency, and a cut-off frequency variable type notch filter 21 removes the resonance frequency.

According to an improved method of the aforesaid method, the apparatus is operated while sampling data such as a torque or a speed at every time period, then when a vibration detection portion detects a vibration having a pregiven magnitude, then the frequency of the sampled data is analyzed to obtain some frequencies having large frequency components, and a vibration suppression filter is set which cuts off frequencies or a frequency band equal to or larger than a given frequency with respect to frequencies having large vibration energy.

Thus method will be explained in detail with reference to a constitutional diagram shown in FIG. 5.

In FIG. 5, a reference numeral 1 depicts a servo control portion, 2 a vibration suppression filter, 3 a vibration detection portion, 4 a state variable trace portion, 5 a state variable frequency analysis portion, 8 a motor and 9 a machine to be controlled. The motor 8 includes a driver such as a current amplifier and a detector such as an encoder.

The servo control portion 1 receives a command from a not shown upper controller and controls a feedback signal from the motor 8 so as to follow the command thereby to operate the machine 9. The command received from the upper controller may be one of a positional command, a speed command and a torque command.

The control output from the servo control portion 1 is applied to the motor 8 as a command via the vibration suppression filter 2 having the frequency characteristics of decaying or a frequency band equal to or larger than a setting frequency.

The vibration detection portion 3 calculates a vibration level based on the feedback signal of the motor and the command to the motor and determines that the vibration is detected when the vibration level exceeds a threshold value set in advance.

The state variable trace portion 4 stores time histories the feedback signal of the motor, the command to the motor and values calculated based on them.

The state variable frequency analysis portion 5 analyzes the frequencies based on the data of the state variable trace portion 4 to calculate the vibration frequency.

The operation of the aforesaid configuration will be explained with reference to FIG. 6.

First, in step D1, the time histories such as the feedback signal of the motor are stored in the state variable trace portion 4 while performing the servo control.

In step D2, the vibration detection portion 3 calculates the vibration level, and determines that the vibration is detected when the vibration level exceeds the threshold value set in advance, whereby the process proceeds to step D3.

In step D3, the state variable frequency analysis portion 5 analyzes the frequencies based on the data of the state variable trace portion 4 to calculate the vibration spectrums of the respective frequencies, and outputs the frequency having a large spectrum or vibration energy, whereby the process proceeds to step D4.

In step D4, the frequency characteristics of the vibration suppression filter 2 is set based on the frequency obtained from the state variable frequency analysis portion 5. For example, when the vibration is due to the mechanical resonance, the vibration suppression filter is set to the configuration of a notch filter in which the obtained frequency has a selectively small gain, whereby the resonance characteristics can be effectively suppressed and controlled. According to the aforesaid method, the vibration suppression filter can be automatically set on-line.

Patent Document 1; Japanese Patent Unexamined Publication JP-A-05-346813 (FIG. 1)

Problem to be Solved

However, in the method of the related art, when the vibration suppression filter is set in the case where the accuracy of the frequency characteristics is bad or there are plural resonance frequencies, there is possibility that the vibration is excited or increased on the contrary.

Further, since the automatic setting starts when the vibration is detected on the way of the operation, it is difficult for an operator to stop the operation when the vibration increases.

Furthermore, since the frequencies are analyzed when the vibration is detected and then the vibration suppression filter is set, the vibration cannot be suppressed while the frequency is analyzed. Thus, when it takes a long time to analyze the frequencies, the machine may be damaged due to such a phenomenon that the amplitude of the vibration becomes too large before suppressing the vibration. In contrast, when the number of data for the frequency analysis is reduced in order to reduce the time required for the frequency analysis, the vibration may not be suppressed sufficiently due to such a fact that the frequency detection accuracy is degraded or the frequency detection range is narrowed.

Accordingly, an object of the invention is to provide a method of canceling a setting safely within an automatic setting sequence even in a case where a vibration suppression filter has an opposite effect. Alternatively, an object of the invention is to automatically set a setting frequency or a combination of setting frequencies where the vibration suppression filter works effectively in a case where there are plural resonance frequencies.

Further, an object of the invention is to provide a method of automatically setting a vibration suppression filter which can start the vibration suppression in a time as short as possible after the detection of the vibration and suppress the vibration with a sufficient accuracy.

Means to Solve the Problem

In order to attain the aforesaid object, according to a first aspect of the invention, there is provided a method of automatically setting a vibration suppression filter in a servo control apparatus which comprises:

a servo control portion for tracing a control system to a command;

the vibration suppression filter;

a vibration detection portion which measures a vibration level of the control system to detect a vibration;

a state variable trace portion for the control system; and a state variable frequency analysis portion, wherein when the vibration detection portion detects a vibration, the state variable frequency analysis portion analyzes frequencies of data from the state variable trace portion to calculate a vibration frequency, and frequency characteristics of the vibration suppression filter is set based on the vibration frequency, the method of automatically setting the vibration suppression filter comprising:

storing a vibration level before an automatic setting of the vibration suppression filter to a vibration level store portion;

in a filter setting selection portion, comparing a vibration level after the automatic setting with the vibration level before the automatic setting; and when the vibration level after the automatic setting is larger than the vibration level before the automatic setting, performing at least one of restoring of a setting of the vibration suppression filter to a state before the automatic setting and reducing a gain of the servo control portion.

According to a second aspect of the invention, there is provided a method of automatically setting a vibration suppression filter in a servo control apparatus which comprises:

a servo control portion for tracing a control system to a command;

the vibration suppression filter;

a vibration detection portion which measures a vibration level of the control system to detect a vibration;

a state variable trace portion for the control system; and a state variable frequency analysis portion, wherein when the vibration detection portion detects a vibration, the state variable frequency analysis portion analyzes frequencies of data from the state variable trace portion to calculate a vibration frequency, and frequency characteristics of the vibration suppression filter is set based on the vibration frequency, the method of automatically setting the vibration suppression filter comprising:

in the state variable frequency analysis portion, calculating a plurality of vibration frequency candidates, based on the plurality of vibration frequency candidates and combinations thereof, sequentially setting the frequency characteristics of the vibration suppression filter and measuring and storing a vibration level; and in a filter setting selection portion, determining a setting of the vibration suppression filter which is expected to have a smallest vibration level.

According to a third aspect of the invention, there is provided a method of automatically setting a vibration suppression filter in a servo control apparatus which comprises:

a servo control portion for tracing a control system to a command;

the vibration suppression filter;

a vibration detection portion which measures a vibration level of the control system to detect a vibration;

a state variable trace portion for the control system; and a state variable frequency analysis portion, wherein when the vibration detection portion detects a vibration, the state variable frequency analysis portion analyzes frequencies of data from the state variable trace portion to calculate a vibration frequency, and frequency characteristics of the vibration suppression filter is set based on the vibration frequency, the method of automatically setting a vibration suppression filter comprising:

when a vibration is detected, first, setting the vibration suppression filter based on a result of the frequency analysis using a part of the data of the state variable trace portion; and setting the vibration suppression filter based on a result of the frequency analysis using all of the data of the state variable trace portion.

According to a fourth aspect of the invention, there is provided an apparatus for automatically setting a vibration suppression filter for a servo control apparatus comprising:

a servo control portion for tracing a control system to a command, the vibration suppression filter having frequency characteristics which decaying a component of frequencies or a frequency band equal to or larger than a setting frequency;

a vibration detection portion which calculates a vibration level based on a feedback signal of a motor and a command to the motor, and determines that a vibration is detected when the vibration level exceeds a threshold value set in advance;

a vibration level store portion which stores the calculation result of the vibration detection portion, a state variable trace portion of the control system which stores the feedback signal of the motor, the command to the motor and time histories of values calculated based on them, a state variable frequency analysis portion which analyzes frequencies based on the data of the state variable trace portion to calculate vibration frequencies, and a filter setting selection portion which has a setting before an automatic setting of the vibration suppression filter and a setting of the automatic setting obtained by the frequency analysis, and switches between these settings, wherein when the vibration detection portion detects a vibration, the state variable frequency analysis portion analyzes frequencies of the data of the state variable trace portion to calculate vibration frequency thereby to set frequency characteristics of the vibration suppression filter based on the calculated vibration frequency, the vibration level store portion stores a vibration level before the automatic setting of the vibration suppression filter, the filter setting selection portion compares a vibration level after the automatic setting with the vibration level before the automatic setting stored in the vibration level store portion, and when the vibration level after the automatic setting is larger than the vibration level before the automatic setting, at least one of restoring of a setting of the vibration suppression filter to a state before the automatic setting and reducing of a gain of the servo control portion is performed.

According to a fifth aspect of the invention, there is provided an apparatus for automatically setting a vibration suppression filter for a servo control apparatus, comprising:

a servo control portion for tracing a control system to a command;

the vibration suppression filter having frequency characteristics which decaying a component of frequencies or a frequency band equal to or larger than a setting frequency;

a vibration detection portion which calculates a vibration level based on a feedback signal of a motor and a command to the motor and determines that a vibration is detected when the vibration level exceeds a threshold value set in advance;

a vibration level store portion which stores the calculation result of the vibration detection portion;

a state variable trace portion of the control system which stores the feedback signal of the motor, the command to the motor and time histories of values calculated based on them;

a state variable frequency analysis portion which calculates a plurality of vibration frequency candidates; and a filter setting selection portion which has settings of automatic settings obtained by analysis of the plural frequencies of the vibration suppression filter, and switches between these settings, wherein when the vibration detection portion detects a vibration, the state variable frequency analysis portion analyzes frequencies of the data of the state variable trace portion to calculate vibration frequency thereby to set frequency characteristics of the vibration suppression filter based on the calculated vibration frequency, the state variable frequency analysis portion sequentially sets the frequency characteristics of the vibration suppression filter based on the plurality of vibration frequency candidates and combinations thereof and thereafter measures and stores a vibration level, and the filter setting selection portion determines a setting of the vibration suppression filter which is expected to have a smallest vibration level.

According to a sixth aspect of the invention, there is provided an apparatus for automatically setting a vibration suppression filter for a servo control apparatus, comprises:

a servo control portion for tracing a control system to a command;

the vibration suppression filter having frequency characteristics which decaying a component of frequencies or a frequency band equal to or larger than a setting frequency;

a vibration detection portion which calculates a vibration level based on a feedback signal of a motor and a command to the motor and determines that a vibration is detected when the vibration level exceeds a threshold value set in advance;

a vibration level store portion which stores the calculation result of the vibration detection portion;

a state variable trace portion of the control system which stores the feedback signal of the motor, the command to the motor and time histories of values calculated based on them;

a state variable frequency analysis portion which analyzes frequencies based on the data of the state variable trace portion to calculate vibration frequencies; and a filter setting selection portion which sets the vibration suppression filter based on a calculated result of the state variable frequency analysis portion, wherein when the vibration detection portion detects a vibration, the state variable frequency analysis portion analyzes frequencies of the data of the state variable trace portion to calculate vibration frequency thereby to set frequency characteristics of the vibration suppression filter based on the calculated vibration frequency, after the vibration detection portion detects a vibration, first, the state variable frequency analysis portion analyzes the frequencies based on a part of data of the state variable trace portion, then the filter setting selection portion sets the vibration suppression filter based on a result of the frequency analysis, then the state variable frequency analysis portion analyzes the frequencies based on all data of the state variable trace portion, and then the filter setting selection portion sets the vibration suppression filter based on a result of the analysis using all of the data of the state variable trace portion.

Advantage of the Invention

According to the first and fourth aspects of the invention, even when the vibration becomes large due to the automatic setting of the vibration suppression filter, the setting is restored automatically and quickly and so the enlargement of the vibration can be prevented. Alternatively, the vibration can be suppressed by reducing the control gain.

Further, according to the second and fifth aspects of the invention, even when there are two or more resonance frequencies of the machine, an effective filter setting can be found automatically. Furthermore, even if a vibration frequency not originally existing in the machine arises within the calculation of the frequency analysis, since the setting is not employed, only the effective filter setting can be employed.

Furthermore, according to the third and fifth aspects of the invention, after detecting the vibration, first, the vibration suppression filer is set based on a result of the frequency analysis according to a method using a part of the data which is not complete in the accuracy but can calculate at a high speed, whereby the abrupt divergence of vibration can be prevented. Further, the vibration suppression filer is set again based on a result of the frequency analysis according to a method using all of the data which takes a long calculation time but is highly accurate, the frequency can be obtained surely and the vibration can be suppressed.

Figure 1:
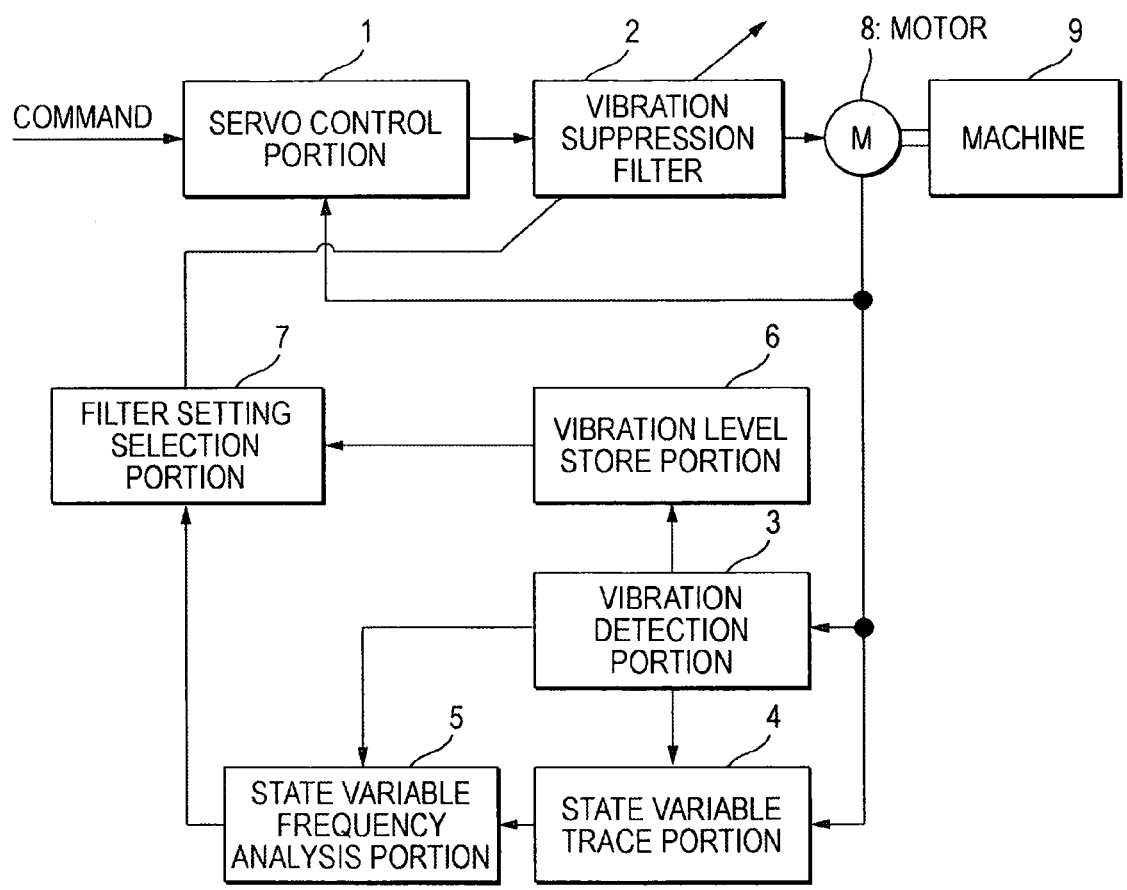
FIG 1 is a diagram showing the configuration of the automatic setting method of a vibration suppression filter according to the first embodiment of the invention.

EXPLANATION OF REFERENCE NUMERALS 1 servo control portion
2 vibration suppression filter
3 vibration detection portion
4 state variable trace portion
5 state variable frequency analysis portion
6 vibration level store portion
7 filter setting selection portion
8 motor
9 machine

BEST MODE FOR CARRYING OUT THE INVENTION

Hereinafter, the first embodiment of the invention will be explained based on drawings.

FIRST EMBODIMENT

Figure 2:
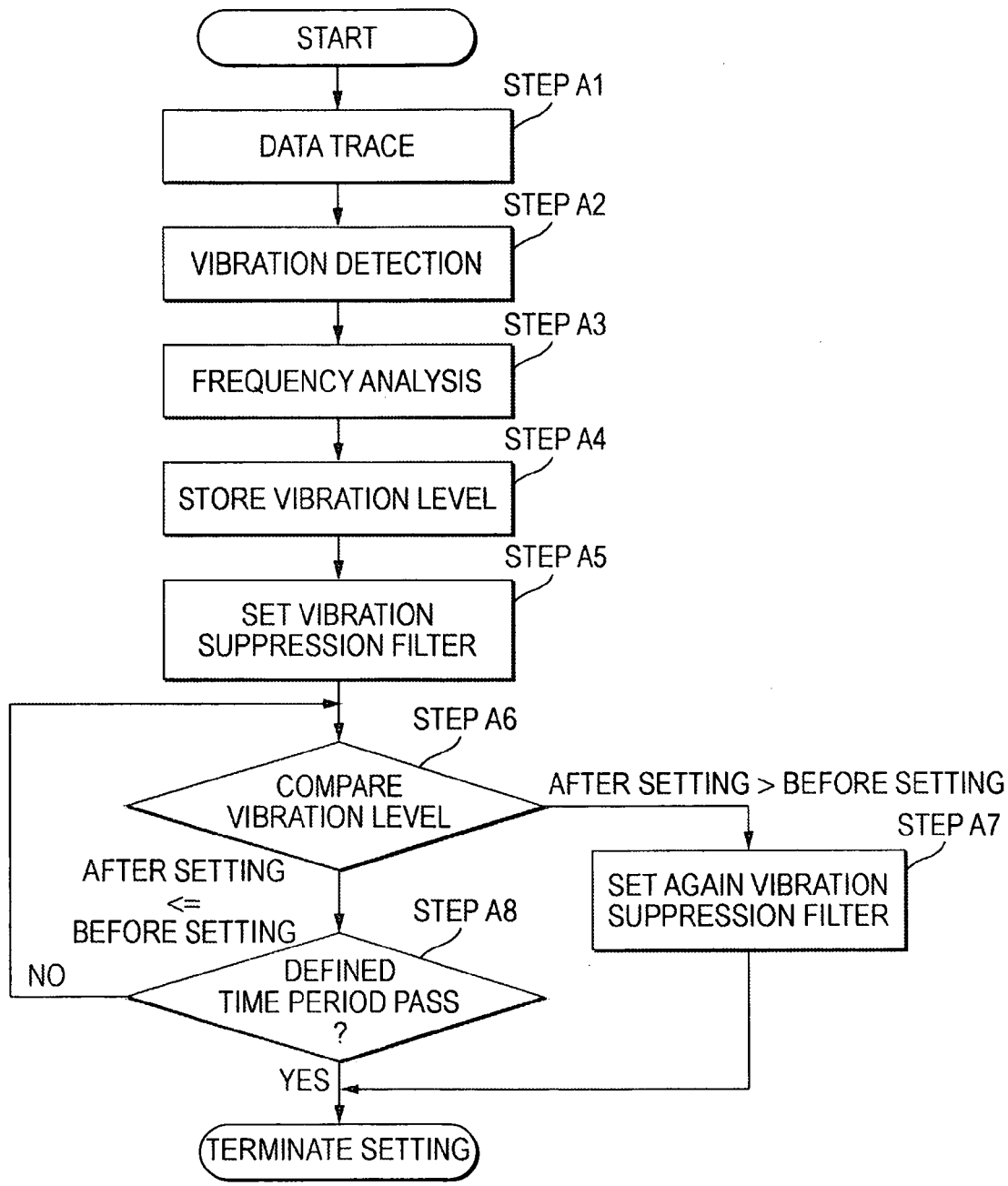
FIG. 2 is a flowchart showing the processing of the automatic setting method of the vibration suppression filter shown in FIG. 1.

FIG. 1 is a diagram showing the configuration of the automatic setting method of a vibration suppression filter according to the first embodiment of the invention. FIG. 2 is a flowchart showing the processing of the automatic setting method of the vibration suppression filter shown in FIG. 1. In FIG. 1, a reference numeral 1 depicts a servo control portion, 2 a vibration suppression filter, 3 a vibration detection portion, 4 a state variable trace portion, 5 a state variable frequency analysis portion, 6 a vibration level store portion, 7 a filter setting selection portion, 8 a motor and 9 a machine to be controlled. The motor 8 includes a driver such as a current amplifier and a detector such as an encoder.

The servo control portion 1 receives a command from a not-shown upper controller and controls a feedback signal from the motor 8 so as to follow the command thereby to operate the machine 9. The command received from the upper controller may be one of a positional command, a speed command and a torque command.

The control output from the servo control portion 1 is applied to the motor 8 as a command via the vibration suppression filter 2 having the frequency characteristics of decaying or a frequency band equal to or larger than a setting frequency.

The vibration detection portion 3 calculates a vibration level based on the feedback signal of the motor and the command to the motor and determines that the vibration is detected when the vibration level exceeds a threshold value set in advance. The vibration detection portion outputs the vibration level to the vibration level store portion 6. The vibration level may be the amplitude of one of the feedback signal of the motor and the command to the motor, or a difference between the motor speed and an estimated speed of the motor obtained by an observer, for example.

The state variable trace portion 4 stores time histories of the feedback signal of the motor, the command to the motor and values calculated based on them. The calculated values maybe the difference between the motor speed and the estimated speed of the motor obtained by the observer, for example.

The state variable frequency analysis portion 5 analyzes the frequencies based on the data of the state variable trace portion 4 to calculate the vibration frequency. In this case, the frequency having the maximum spectrum or the maximum energy is selected as the vibration frequency.

The vibration level store portion 6 stores the vibration level calculated by the vibration detection portion 3 and reads out it.

The filter setting selection portion has both the setting before the automatic setting of the vibration suppression filter and the setting of the automatic setting obtained by the frequency analysis and can switch between both the settings.

In the aforesaid configuration, the operation according to the first embodiment of the invention will be explained based on a flowchart shown in FIG. 2.

First, in step A1, the time histories such as the feedback signal of the motor are stored in the state variable trace portion 4 while performing the servo control. Next, in step A2, the vibration detection portion 3 calculates the vibration level, and determines that the vibration is detected when the vibration level exceeds the threshold value set in advance, whereby the process proceeds to step A3. Step A1 and step A2 maybe altered in their order. That is, the data after the vibration detection performed in step A2 may be stored in the state variable trace portion.

In step A3, the state variable frequency analysis portion 5 analyzes the frequencies based on the data of the state variable trace portion 4 to calculate the vibration spectrums of the respective frequencies, and outputs the frequency having a large spectrum or vibration energy, whereby the process proceeds to step A4.

In step A4, the vibration level before the automatic setting of the vibration suppression filter 2 is stored in the vibration level store portion 6, whereby the process proceeds to step A5.

In step A5, the filter setting selection portion 7 sets the frequency characteristics of the vibration suppression filter 2 based on the frequency obtained from the state variable frequency analysis portion 5, whereby the process proceeds to step A6.

In step A6, the comparison is made between the vibration level obtained in the vibration detection portion 3 and the vibration level before the automatic setting stored in the vibration level store portion 6, and the process proceeds to step A7 when the current vibration level, that is, the vibration level after the automatic setting is larger. In contrast, the process proceeds to step A8 when the vibration level after the automatic setting is smaller.

In step A7, the filter setting selection portion 7 restores the setting of the vibration suppression filter 2 to the setting before the automatic setting and terminates the automatic setting function.

In step A8, a time period for the comparison of the vibration levels is counted by a timer. When the time period passes over a defined time period, the result obtained from the automatic setting is employed and the automatic setting function is terminated. In contrast, when the time period has not passed over the defined time period yet, the process returns to the comparison of step A6. The counting-up operation of the timer may be performed by the real time or may be formed only during the operation period of the motor. Further, the determination time period may not be limited and the determination may be always continued.

SECOND EMBODIMENT

Next, the second embodiment of the invention will be explained based on a drawing.

Figure 3:
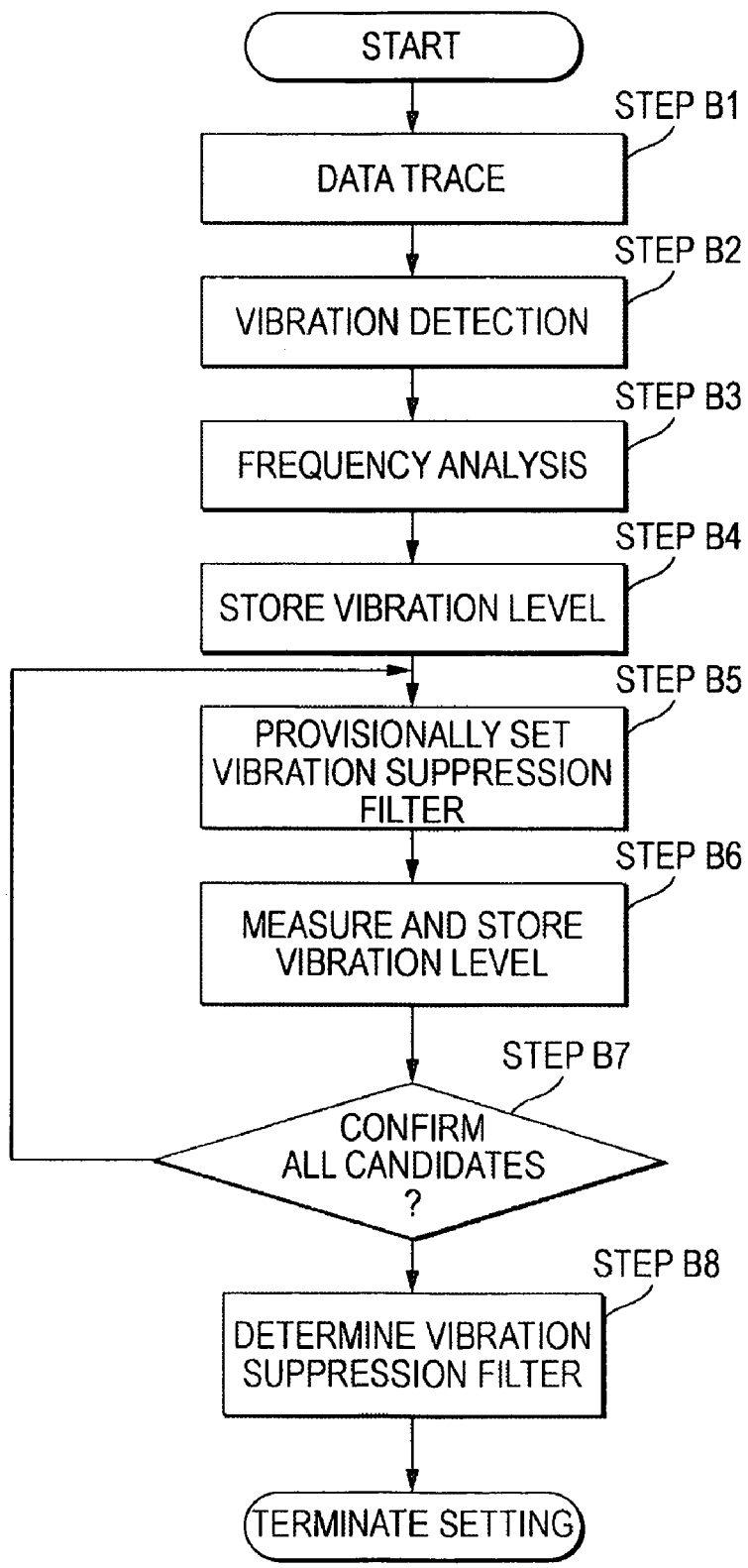
FIG. 3 is a flowchart showing the processing of the automatic setting method of the vibration suppression filter according to the second embodiment of the invention.

FIG. 3 is a flowchart showing the processing of the automatic setting method of the vibration suppression filter according to the second embodiment of the invention.

The operation according to the second embodiment will be explained based on a flowchart shown in FIG. 3.

First, in step B1, the time histories such as the feedback signal of the motor are stored in the state variable trace portion 4 while performing the servo control.

Next, in step B2, the vibration detection portion 3 calculates the vibration level, and determines that the vibration is detected when the vibration level exceeds the threshold value set in advance, whereby the process proceeds to step B3. Step B1 and step B2 may be altered in their order. That is, the data after the vibration detection performed in step B2 may be stored in the state variable trace portion.

In step B3, the state variable frequency analysis portion 5 analyzes the frequencies based on the data of the state variable trace portion 4 to calculate the vibration spectrums of the respective frequencies, and outputs a plurality of frequency candidates having a large spectrum or vibration energy, whereby the process proceeds to step B4.

In step B4, the vibration level before the automatic setting of the vibration suppression filter 2 is stored in the vibration level store portion 6, whereby the process proceeds to step B5.

In step B5, a plurality of vibration suppression filter settings are prepared based on the frequencies and the respective combinations thereof in accordance with the plurality of frequencies obtained in the state variable frequency analysis portion 5. For example, when the amplitudes of 500 Hz and 1,000 Hz are large, there are considered three settings, that is, a setting of decaying the frequency band of 500 Hz, a setting of decaying the frequency band of 1,000 Hz and a setting of decaying 500 Hz and 1,000 Hz. The filter setting selection portion 7 sets one of the plurality of vibration suppression filter settings to the vibration suppression filter 2, whereby the process proceeds to step B6.

In step B6, the vibration level upon the lapse of a certain time period after setting of the filter is obtained from the vibration detection portion 3 and stored in the vibration level store portion 6 as the vibration level corresponding to the filter setting, whereby the process proceeds to step B7.

In step B7, steps B5 to B7 are repeatedly executed until the settings and the measurements of the vibration levels are completed as to all of the plurality of vibration suppression filter settings prepared in step B4.

In step B8, the filter setting selection portion 7 sets the vibration suppression filter setting having the smallest corresponding vibration level to the vibration suppression filter 2, whereby the automatic setting function is completed.

THIRD EMBODIMENT

Next, the third embodiment of the invention will be explained based on drawings.

Figure 4:
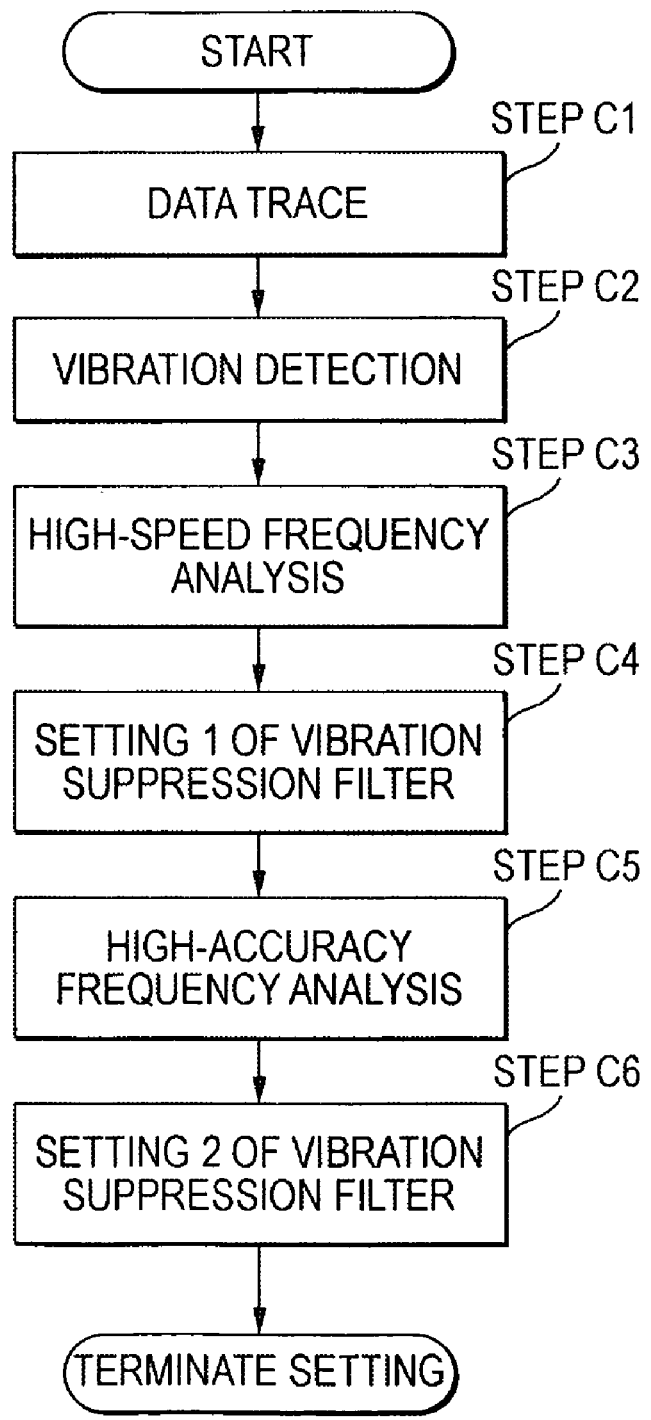
FIG. 4 is a flowchart showing the processing of the automatic setting method of the vibration suppression filter according to the third embodiment of the invention.

FIG. 4 is a flowchart showing the processing of the automatic setting method of the vibration suppression filter according to the third embodiment of the invention.

Figure 5:
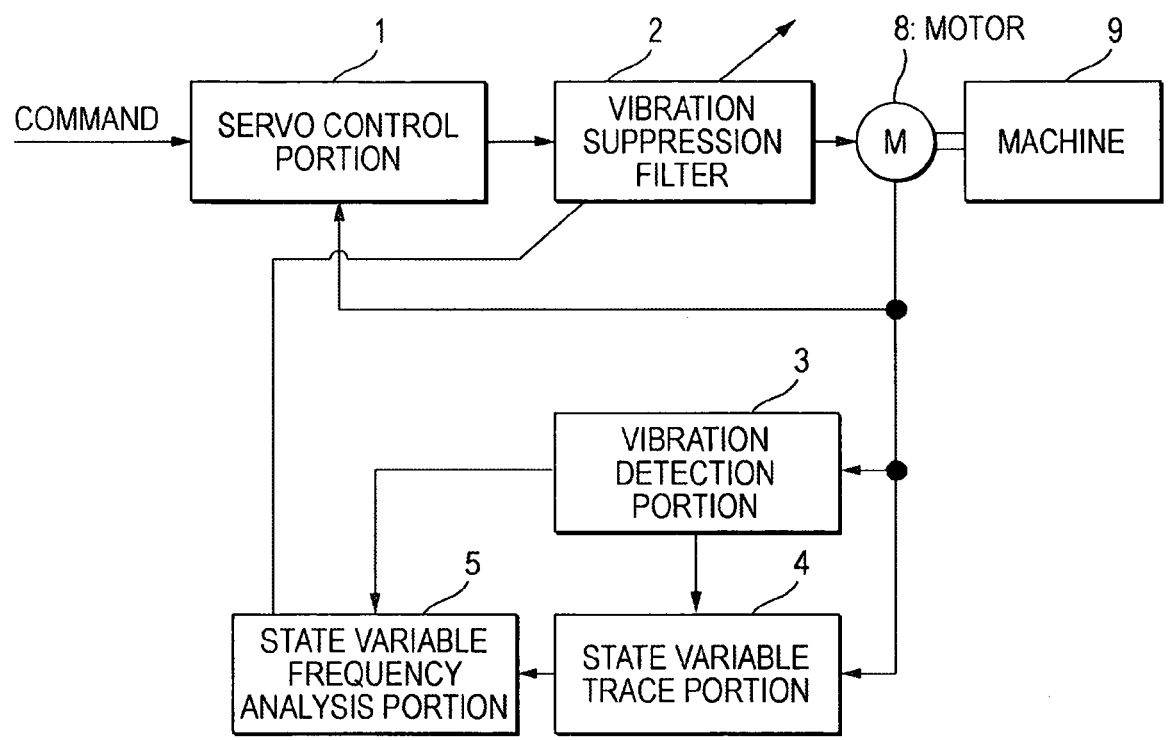
FIG. 5 is a diagram showing the configuration of the automatic setting method of a vibration suppression filter according to the third embodiment of the invention, and also a diagram showing the configuration of the automatic setting method of a vibration suppression filter of a related art of the first embodiment.
Figure 6:
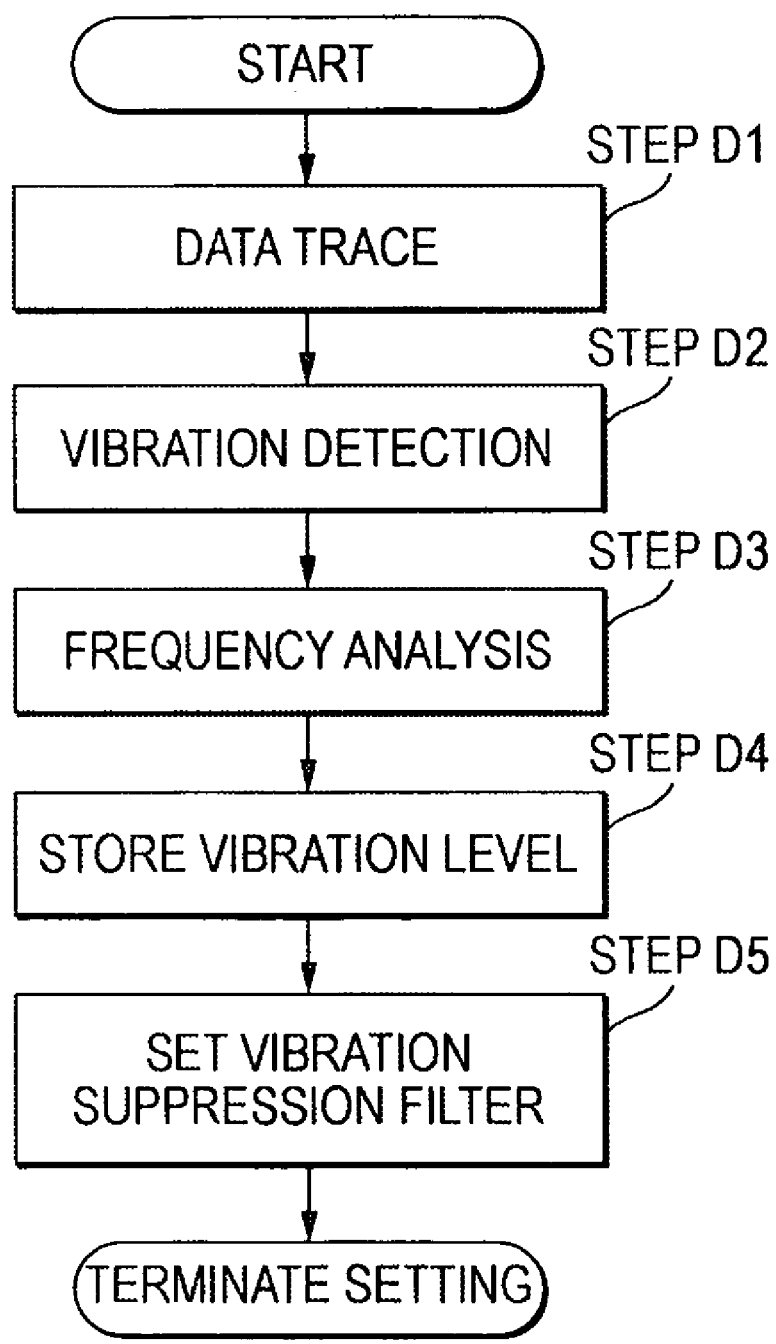
FIG. 6 is a flowchart showing the processing of the automatic setting method of the vibration suppression filter of the related art.
Figure 7:
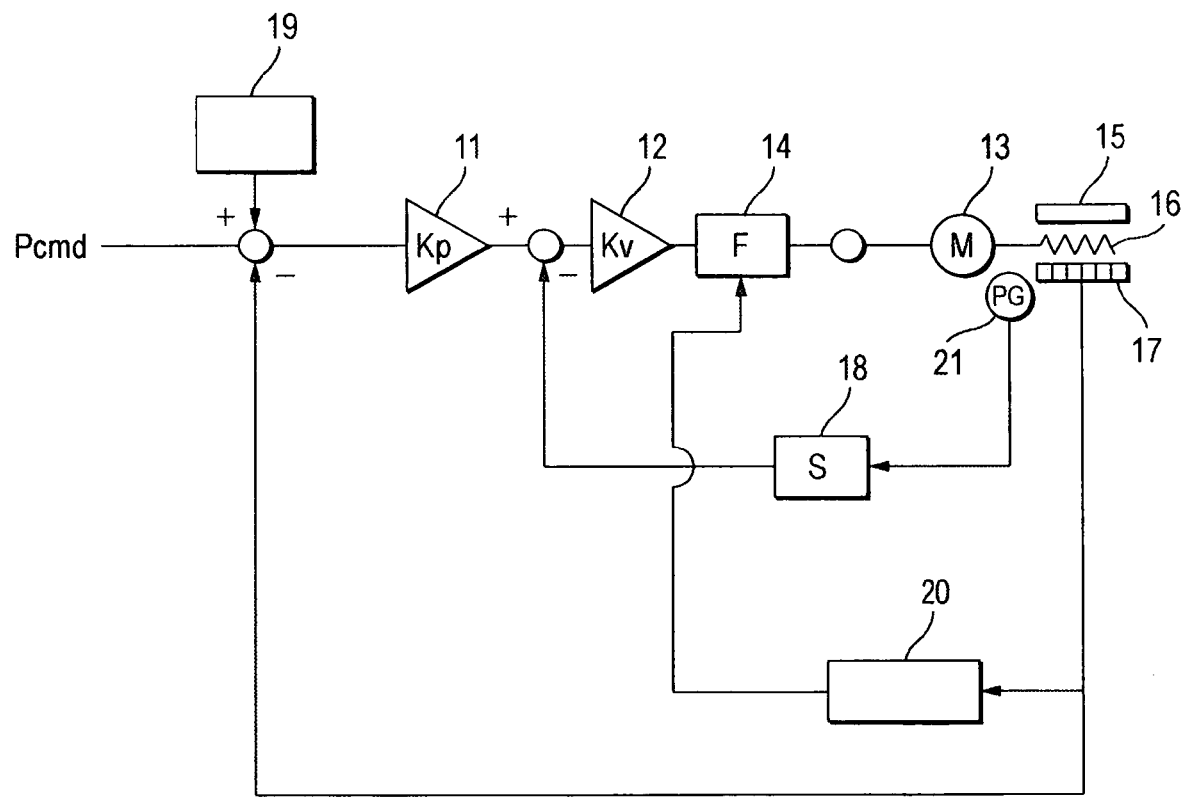
FIG. 7 is a diagram showing the configuration of an NC control apparatus of a related art.

The third embodiment employs the configuration of FIG. 5. That is, FIG. 5 is a diagram showing the configuration of the third embodiment of the invention and has the common configuration as that of the related art of the first and second embodiments. Thus, the configuration of FIG. 5 will be explained again.

In FIG. 5, a reference numeral 1 depicts a servo control portion, 2 a vibration suppression filter, 3 a vibration detection portion, 4 a state variable trace portion, 5 a state variable frequency analysis portion, 8 a motor and 9 a machine to be controlled.

The motor 8 includes a driver such as a current amplifier and a detector such as an encoder.

The servo control portion 1 receives a command from a not-shown upper controller and controls a feedback signal from the motor 8 so as to follow the command thereby to operate the machine 9. The command received from the upper controller may be one of a positional command, a speed command and a torque command.

The control output from the servo control portion 1 is applied to the motor as a command via the vibration suppression filter 2 having the frequency characteristics of decaying or a frequency band equal to or larger than a setting frequency.

The vibration detection portion 3 calculates a vibration level based on the feedback signal of the motor and the command to the motor and determines that the vibration is detected when the vibration level exceeds a threshold value set in advance. The vibration level may be the amplitude of one of the feedback signal of the motor and the command to the motor, or a difference between the motor speed and an estimated speed of the motor obtained by an observer, for example.

The state variable trace portion 4 stores time histories the feedback signal of the motor, the command to the motor and values calculated based on them. The calculated values may be the difference between the motor speed and the estimated speed of the motor obtained by the observer, for example.

The state variable frequency analysis portion 5 analyzes the frequencies based on the data of the state variable trace portion 4 to calculate the vibration frequency and sets the frequency characteristics of the vibration suppression filter 2. In this case, the number of data used for the analysis is variable. The more the number of data used for the analysis is, the better the analysis accuracy becomes but the longer the calculation time is. In contrast, the less the number of data used for the analysis is, the shorter the calculation time is but the smaller the calculation accuracy and the analysis frequency range are. In the normal frequency analysis, it is known that the calculation time is proportional to the square of the number of the data. Further, the frequency having the maximum spectrum or the maximum energy is selected as the vibration frequency.

In the aforesaid configuration, the operation according to the third embodiment of the invention will be explained based on a flowchart shown in FIG. 4.

First, in step C1, the time histories such as the feedback signal of the motor are stored in the state variable trace portion 4 while performing the servo control.

Next, in step C2, the vibration detection portion 3 calculates the vibration level, and determines that the vibration is detected when the vibration level exceeds the threshold value set in advance, whereby the process proceeds to step C3. Step C1 and step C2 may be altered in their order. That is, the data after the vibration detection performed in step C2 may be stored in the state variable trace portion.

In step C3, the state variable frequency analysis portion 5 analyzes the frequencies based on a part of the data of the state variable trace portion 4 to calculate the vibration spectrums of the respective frequencies, and outputs a frequency having a large spectrum or vibration energy, whereby the process proceeds to step C4.

In step C4, the frequency characteristics of the vibration suppression filter 2 is set based on the frequency obtained at step C3, whereby the process proceeds to step C5.

In step C5, the state variable frequency analysis portion 5 analyzes the frequencies based on all the data of the state variable trace portion 4 to calculate the vibration spectrums of the respective frequencies, and outputs a frequency having a large spectrum or vibration energy, whereby the process proceeds to step C6.

In step C6, the frequency characteristics of the vibration suppression filter 2 is set based on the frequency obtained in step C5 and terminates the automatic setting function.

Although the invention is explained in detail with reference to a particular embodiment, it will be apparent for those skilled in the art that various changes or modifications may be added without departing from the spirit and range of the invention.

This application is based on Japanese Patent Application No. 2004-278261 filed on Jun. 16, 2004, the content of which is incorporated herein by reference.

INDUSTRIAL APPLICABILITY

As described above, according to the invention, in the servo control apparatus for driving the servo motor, when a machine etc. vibrates, the vibration is detected to automatically set the vibration suppression filter. When the vibration occurs due to the automatic setting, the setting is restored or one expected to have the smallest vibration level is employed among the plurality of settings. Thus, the invention can be applied to a machine with a low rigidity such as a robot in which the mechanical vibration likely occurs or to a high-speed and high-accuracy positioning usage in which the stiffness of controller is desired to be as high as possible.

Further, when the vibration is detected during the actual operation of a machine, the frequencies of the vibration are analyzed, then the high-speed analysis is performed by using a part of the data, and the vibration suppression filter is provisionally set due to the analysis result thereby to prevent abrupt divergence of the vibration. Thereafter, the high-accuracy analysis is performed by using all the data, and the vibration suppression filter is set due to the analysis result, so that the vibration can be suppressed completely. Thus, the invention can be applied to a machine with a low rigidity such as a robot in which the mechanical vibration likely occurs or to a high-speed and high-accuracy positioning usage in which the stiffness of controller is desired to be as high as possible.

The invention claimed is:

1. A method of automatically setting a vibration suppression filter in a servo control apparatus comprising:
   tracing a control system to a command;
   measuring a vibration level of the control system to detect a vibration when a vibration level exceeds a threshold value;
   analyzing frequencies of data from a state variable trace portion to calculate a vibration frequency, and
   setting frequency characteristics of a vibration suppression based on the vibration frequency,
   setting the vibration suppression filter further comprises:
   storing a vibration level before an automatic setting of the vibration suppression filter to a vibration level store portion;
   in a filter setting selection portion, comparing a vibration level after the automatic setting with the vibration level before the automatic setting; and
   when the vibration level after the automatic setting is larger than the vibration level before the automatic setting, performing at least one of restoring of a setting of the vibration suppression filter to a state before the automatic setting and reducing a gain of the servo control portion.

2. A method of automatically setting a vibration suppression filter in a servo control apparatus comprising:
   tracing a control system to a command;
   measuring a vibration level of the control system to detect a vibration when the vibration level exceeds a threshold;
   analyzing frequencies of data from a state variable trace portion to calculate a vibration frequency, and
   setting frequency characteristics of a vibration suppression filter based on the vibration frequency,
   the method of automatically setting the vibration suppression filter further comprising:
   in the state variable frequency analysis portion, calculating a plurality of vibration frequency candidates,
   based on the plurality of vibration frequency candidates and combinations thereof, sequentially setting frequency characteristics of the vibration suppression filter and measuring and storing a vibration level; and
   in a filter setting selection portion, determining a setting of the vibration suppression filter which is expected to have a smallest vibration level.

3. A method of automatically setting a vibration suppression filter in a servo control apparatus comprising:
   tracing a control system to a command;
   a vibration detection portion which measures a vibration level of the control system to detect a vibration when the vibration level exceeds a threshold;
   analyzing frequencies of data from a state variable trace portion to calculate a vibration frequency, and
   setting frequency characteristics of a vibration suppression filter set based on the vibration frequency,
   the method of automatically setting a vibration suppression filter further comprising:
   when a vibration is detected, first, setting the vibration suppression filter based on a result of the frequency analysis using a part of the data of the state variable trace portion; and
   setting the vibration suppression filter based on a result of the frequency analysis using all of the data of the state variable trace portion.

4. An apparatus for automatically setting a vibration suppression filter for a servo control apparatus comprising:
   a servo control portion for tracing a control system to a command,
   the vibration suppression filter having frequency characteristics which decaying a component of frequencies or a frequency band equal to or larger than a setting frequency;
   a vibration detection portion which calculates a vibration level based on a feedback signal of a motor and a command to the motor, and determines that a vibration is detected when the vibration level exceeds a threshold value set in advance;
   a vibration level store portion which stores the calculation result of the vibration detection portion,
   a state variable trace portion of the control system which stores the feedback signal of the motor, the command to the motor and time histories of values calculated based on them,
   a state variable frequency analysis portion which analyzes frequencies based on the data of the state variable trace portion to calculate vibration frequencies, and
   a filter setting selection portion which has a setting before an automatic setting of the vibration suppression filter and a setting of the automatic setting obtained by the frequency analysis, and switches between these settings,
   wherein when the vibration detection portion detects a vibration, the state variable frequency analysis portion analyzes frequencies of the data of the state variable trace portion to calculate vibration frequency thereby to set frequency characteristics of the vibration suppression filter based on the calculated vibration frequency,
   the vibration level store portion stores a vibration level before the automatic setting of the vibration suppression filter,
   the filter setting selection portion compares a vibration level after the automatic setting with the vibration level before the automatic setting stored in the vibration level store portion, and
   when the vibration level after the automatic setting is larger than the vibration level before the automatic setting, at least one of restoring of a setting of the vibration suppression filter to a state before the automatic setting and reducing of a gain of the servo control portion is performed.

5. An apparatus for automatically setting a vibration suppression filter for a servo control apparatus, comprising:
   a servo control portion for tracing a control system to a command;
   the vibration suppression filter having frequency characteristics which decaying a component of frequencies or a frequency band equal to or larger than a setting frequency;

a vibration detection portion which calculates a vibration level based on a feedback signal of a motor and a command to the motor and determines that a vibration is detected when the vibration level exceeds a threshold value set in advance;

a vibration level store portion which stores the calculation result of the vibration detection portion;

a state variable trace portion of the control system which stores the feedback signal of the motor, the command to the motor and time histories of values calculated based on them;

a state variable frequency analysis portion which calculates a plurality of vibration frequency candidates; and a filter setting selection portion which has settings of automatic settings obtained by analysis of the plural frequencies of the vibration suppression filter, and switches between these settings, wherein when the vibration detection portion detects a vibration, the state variable frequency analysis portion analyzes frequencies of the data of the state variable trace portion to calculate vibration frequency thereby to set frequency characteristics of the vibration suppression filter based on the calculated vibration frequency, the state variable frequency analysis portion sequentially sets the frequency characteristics of the vibration suppression filter based on the plurality of vibration frequency candidates and combinations thereof and thereafter measures and stores a vibration level, and the filter setting selection portion determines a setting of the vibration suppression filter which is expected to have a smallest vibration level.

6. An apparatus for automatically setting a vibration suppression filter for a servo control apparatus, comprises:

a servo control portion for tracing a control system to a command;

the vibration suppression filter having frequency characteristics which decaying a component of frequencies or a frequency band equal to or larger than a setting frequency;

a vibration detection portion which calculates a vibration level based on a feedback signal of a motor and a command to the motor and determines that a vibration is detected when the vibration level exceeds a threshold value set in advance;

a vibration level store portion which stores the calculation result of the vibration detection portion;

a state variable trace portion of the control system which stores the feedback signal of the motor, the command to the motor and time histories of values calculated based on them;

a state variable frequency analysis portion which analyzes frequencies based on the data of the state variable trace portion to calculate vibration frequencies; and a filter setting selection portion which sets the vibration suppression filter based on a calculated result of the state variable frequency analysis portion, wherein when the vibration detection portion detects a vibration, the state variable frequency analysis portion analyzes frequencies of the data of the state variable trace portion to calculate vibration frequency thereby to set frequency characteristics of the vibration suppression filter based on the calculated vibration frequency, after the vibration detection portion detects a vibration, first, the state variable frequency analysis portion analyzes the frequencies based on a part of data of the state variable trace portion, then the filter setting selection portion sets the vibration suppression filter based on a result of the frequency analysis, then the state variable frequency analysis portion analyzes the frequencies based on all data of the state variable trace portion, and then the filter setting selection portion sets the vibration suppression filter based on a result of the analysis using all of the data of the state variable trace portion.

* * * * *